United States Patent [19]

Yamaji

[11] Patent Number: 5,745,098

[45] Date of Patent: Apr. 28, 1998

[54] METHOD AND APPARATUS FOR SCROLL DISPLAYING AN IMAGE ON SCREEN

[75] Inventor: Satoshi Yamaji, Kawasaki, Japan

[73] Assignee: Fujitsu Limited, Kawasaki, Japan

[21] Appl. No.: 744,070

[22] Filed: Nov. 4, 1996

Related U.S. Application Data

[63] Continuation of Ser. No. 279,859, Jul. 26, 1994, abandoned.

[30] Foreign Application Priority Data

Nov. 26, 1993 [JP] Japan .................. 5-295871

[51] Int. Cl.$^6$ .................................. G09G 5/34
[52] U.S. Cl. .................. 345/121; 345/145; 345/341
[58] Field of Search .................. 345/121, 123–126, 345/113, 145, 157, 340, 341, 342

[56] References Cited

U.S. PATENT DOCUMENTS

| | | | |
|---|---|---|---|
| 4,720,703 | 1/1988 | Schnarel, Jr. et al. | 345/121 |
| 4,734,685 | 3/1988 | Watanabe | 345/157 |
| 4,831,556 | 5/1989 | Oono | 345/127 |
| 5,006,837 | 4/1991 | Bowers | 345/123 |
| 5,075,673 | 12/1991 | Yanker | 345/119 |
| 5,133,025 | 7/1992 | Koyama | 345/127 |
| 5,146,049 | 9/1992 | Shima | 345/157 |
| 5,172,102 | 12/1992 | Iwamura | 345/125 |
| 5,172,103 | 12/1992 | Kita | 345/127 |
| 5,187,776 | 2/1993 | Yanker | 345/127 |
| 5,200,738 | 4/1993 | Fumoto et al. | 345/123 |
| 5,208,588 | 5/1993 | Nishiyama | 345/123 |
| 5,221,921 | 6/1993 | Statt | 345/127 |
| 5,263,134 | 11/1993 | Paal et al. | 345/145 |
| 5,289,168 | 2/1994 | Freeman | 345/127 |
| 5,327,158 | 7/1994 | Takahashi | 345/127 |

Primary Examiner—Steven Saras
Attorney, Agent, or Firm—Staas & Halsey

[57] ABSTRACT

At the time of a scrolling operation, the pointer coordinates (x, y) when moving the pointer on the display are detected and converted into the coordinates values (X, Y) of a whole image region on a memory by using coordinates conversion magnifications (K1, K2). An image in the display region corresponding to the screen region is extracted from the memory while using the conversion coordinates values (X, Y) as a start point (origin) and is displayed on a display. The extracting display by the coordinates conversion is repeated at a sampling period of the pointer which is moved. The extracted image is scroll displayed in association with the pointer movement.

15 Claims, 9 Drawing Sheets

METHOD AND APPARATUS FOR SCROLL DISPLAYING AN IMAGE ON SCREEN

This application is a continuation of application Ser. No. 08/279,859, filed Jul. 26, 1994, now abandoned.

BACKGROUND OF THE INVENTION

The present invention relates to a scroll displaying apparatus and method for extracting a display image from a memory and scroll displaying onto a display screen and, more particularly, to a scroll displaying apparatus and method for scrolling the screen by using a pointer displayed on the display screen.

Figure 1:
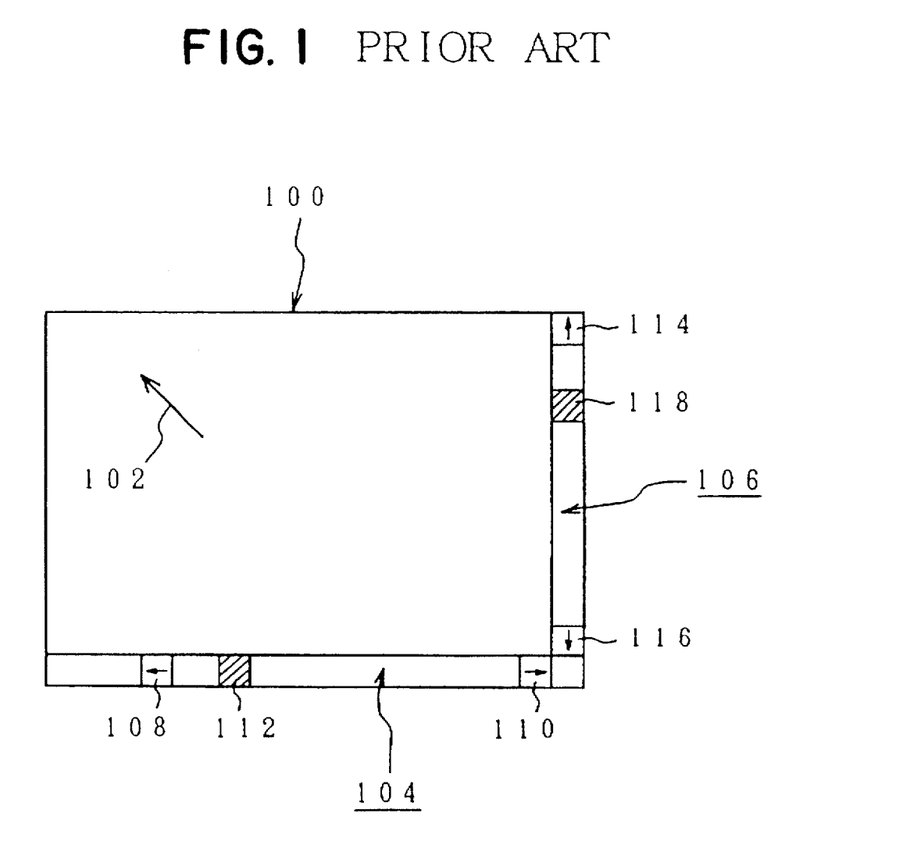
FIG. 1 is an explanatory diagram of a conventional scrolling process.

In the case where a physical display region of a display is narrower than an image storage region of a memory (for example, in the case of the display using a window) a scroll display is performed. FIG. 1 shows a display window having a conventional scroll function. A pointer 102 of an arrow is displayed in a display window 100 and can be moved to an arbitrary position by the operation of a mouse. Scroll bars 104 and 106 are displayed along the lower perimeter and right perimeter of the display window 100. For example, operation markers 108 and 110 are displayed on both sides of the lower scroll bar 104. A scroll position marker 112 is displayed between them. In a manner similar to the above, operation markers 114 and 116 and a scroll position marker 118 are also displayed in the scroll bar 106 on the right side. In case of the scroll display, the pointer 102 is moved to, for example, the operation marker 108 of the scroll bar 104 on the lower side and the mouse is clicked. Thus, the screen is scrolled in the direction shown by an arrow. At the same time, the marker 112 is moved and indicates which position in the image region on a memory device is being scrolled.

In the conventional scroll apparatus using such scroll bars, however, it is necessary to move the pointer to the position of the scroll bar. Therefore, when it is necessary to scroll by using the pointer while some input is being executed on the window, the inputting operation must be interrupted and the scrolling operation must be executed. In case of frequently scrolling of the screen, there are problems such that the number of occurrences of moving the pointer between the display region and the scroll bar increases and the operation becomes complicated, therefore increasing the burden on the user. Therefore, a method of scrolling by the switching to a scroll moving mode without using the pointer is also considered. However, there are problems such that another input apparatus or input operations to perform the switching to the scroll mode and the scrolling operation are necessary in addition to the pointer, so that the operations become complicated.

SUMMARY OF THE INVENTION

According to the invention, there are provided an apparatus and a method which can perform a scroll display by a simple operation without needing to move a pointer to the position of a marker which is used in the scrolling operation.

According to the invention, a whole image region having first display coordinates (X, Y) is set into whole image information stored in a memory. A screen region having second display coordinates (x, y) is set onto a display screen of a display unit by which a partial image extracted from the whole image region is displayed. The screen region is used as, for example, a window region.

A conversion magnification setting section sets coordinates conversion magnifications K1 and K2 for converting the coordinates values (x, y) of the screen region into the coordinates values (X, Y) of the whole image region. That is, when a width in the X-axis direction and a width in the Y-axis direction of the whole image region are set to A1 and A2 and a width in the X-axis direction and a width in the Y-axis direction of the screen region (window region) are set to B1 and B2, respectively, the conversion magnifications K1 and K2 are calculated by the following equations and are set.

$$K1 = A1/B1$$

$$K2 = A2/B2$$

A pointer operating section using a mouse or the like moves the pointer on the screen of the display at the time of the scrolling operation. In this instance, a pointer movement detecting section detects the pointer coordinates values (x, y) after completion of the movement from the movement amount of the pointer on the screen. A coordinates converting section converts the pointer coordinates values (x, y) after completion of the movement detected by the pointer movement detecting section into the coordinates values (X, Y) of the whole image region by using the coordinates conversion magnifications K1 and K2. That is, now assuming that the coordinates values on the pointer movement destination side on the screen region by the scrolling operation are set to (x, y), the coordinates values are converted into the coordinates values (X, Y) of the whole image region by the following equations.

$$X = K1 \cdot x$$

$$Y = K2 \cdot y$$

After completion of the coordinates conversion, the conversion coordinates values (X, Y) are set to a start point (origin) and a display region corresponding to the screen region to be extracted from the whole display region is set. An image in this display region is extracted and displayed on the display. Thus, the scroll display in association with the movement of the pointer is performed.

In the scroll display, not only in both of the vertical and lateral directions, by fixing the conversion magnification K1 to 0, the screen can be scrolled in only the vertical direction. By fixing the conversion magnification K2 to 0, the screen can be also scrolled in only the lateral direction.

According to the scroll display of the invention as mentioned above, the movement amount of the pointer on the screen is read and the scroll display is executed on the basis of the movement amount of the pointer. Therefore, there is no need to provide the display of an exclusive-use operating portion such as a scroll bar or the like to the picture frame position. The scroll display of the whole image on a memory device can be easily performed by a small operation amount of the pointer in the screen.

The above and other objects, features, and advantages of the present invention will become more apparent from the following detailed description with reference to the drawings.

DETAILED DESCRIPTION OF THE PREFERRED EMBODIMENTS

Figure 2:
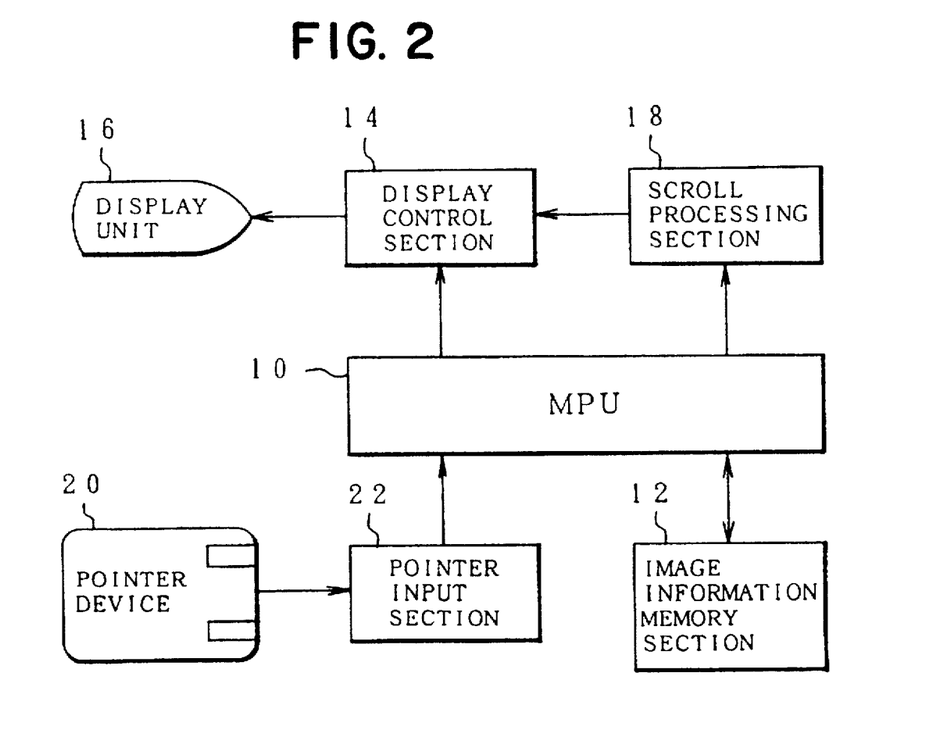
FIG. 2 is a block diagram of a construction of an apparatus of the invention.

In FIG. 2, a microprocessor 10 has a CPU, ROM, and RAM therein and executes arbitrary processes according to an OS and an application program. A memory 12 to store image information, a display control section 14, a display unit 16, a scroll processing section 18, a pointer device 20, and a pointer input section 22 are provided for the microprocessor 10. Image information having a region exceeding a physical display region on the display screen of the display unit 16, what is called whole image information has been stored in the memory 12. Therefore, the image of the region corresponding to the physical display region on the display unit 16 is extracted from the whole image information in the image information memory section 12 by the control of the microprocessor 10 and is displayed under the control by the display control section 14. For example, various kinds of windows are displayed on the display unit 16 and the image information extracted from the whole image information in the memory 12 is displayed into those windows.

Further, the pointer is displayed on the screen of the display unit 16 by the display control by the microprocessor 10. The pointer on the screen can be moved to an arbitrary position by the operation of the pointer device 20. For example, a mouse is used as a pointer device 20. The movement amount due to the mouse operation is input from the pointer input section 22 and is processed by the microprocessor 10, thereby forming the movement of the pointer on the screen according to the movement of the pointer device 20. Operation buttons 20-1 and 20-2 are provided for the pointer device 20. A command of the operation item designated by the pointer can be input by what is called a mouse click such that the pointer is set to the operating portion on the screen and the operation button 20-1 or 20-2 is operated.

Further, according to the invention, the scroll processing section 18 is provided for the microprocessor 10. The scroll processing section 18 has a processing function in a functional block diagram of FIG. 3. The scroll processing section 18 is constructed by a conversion magnification setting section 42, a pointer movement detecting section 46, a coordinates converting section 48, and a display region setting section 50.

The relation between the whole image region in the memory 12 for the scrolling process and the display region on the screen of the display unit 16 will now be described with reference to FIG. 4. A whole image region 24 relates to one image information stored in the memory 12 and a display region 26 which coincides with a screen region 34 is extracted from the whole image region 24 and displayed by the display unit 16. The screen region 34 is a physical display region set on the screen of the display unit 16. As a screen region 34, a display region of the window by the microprocessor 10 is used. The whole image region 24 stored in the memory 12 is actually stored in a memory device such as an SRAM or the like. For simplicity of explanation, however, the whole image region 24 is shown as a set of dot patterns which are obtained by developing the pixel information constructing the image into the two-dimensional coordinates. On the other hand, the screen region 34 is a physical display region on the screen of the display unit 16 and has a two-dimensional pixel arrangement, namely, dot pattern arrangement which is determined by the resolution of the display screen. Therefore, the sizes in the vertical and lateral directions of the whole image region 24 and screen region 34 are defined by the numbers of dots, respectively.

Figure 4A:
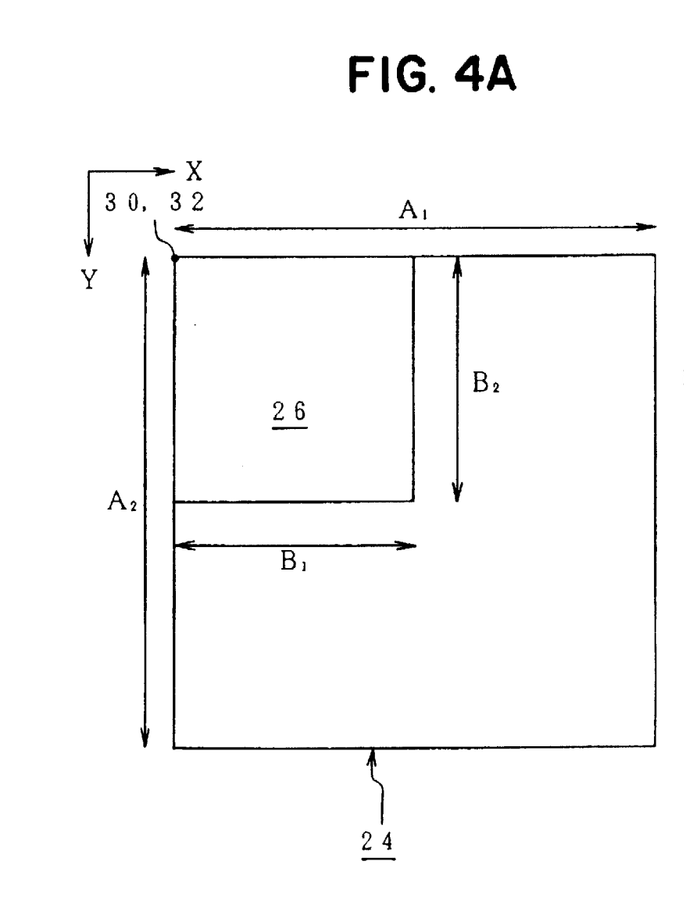
FIG. 4 is a relational diagram among the whole image region in the scrolling process, display region, and screen region in the invention.
Figure 4B:
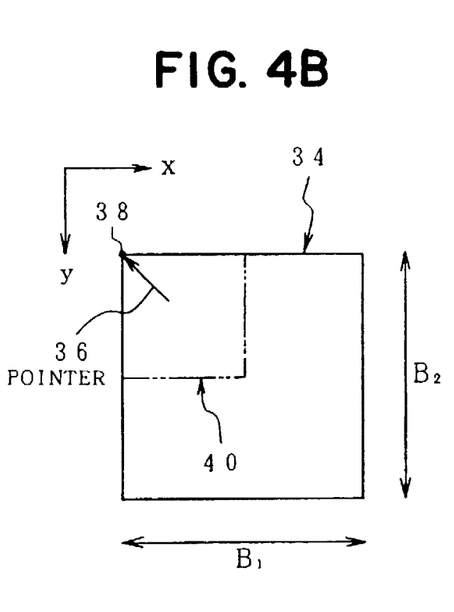

In the case of FIG. 4, two-dimensional coordinates (X, Y) are set as first display coordinates into the whole image region 24 by the function as a first region setting section of the microprocessor 10. The sizes are set to A1 in the X direction (lateral direction) and to A2 in the Y direction (vertical direction). Display coordinates (x, y) which are peculiar as second display coordinates are also set into the screen region 34 by the function as a second region setting section of the microprocessor 10. The sizes are set to B1 in the x direction (lateral direction) and to B2 in the y direction (vertical direction). Further, the display region 26 to extract the display image from the whole image region 24 has the same sizes B1 (in the lateral direction) and B2 (in the vertical direction) as those in the screen region 34. The origin of the coordinates (X, Y) in the whole image region 24 is set to an origin 30 at the left upper corner. In FIG. 4, the display region 26 is shown at the upper corner of the whole image region 24 so as to overlap. A relative origin 32 for the coordinates (X, Y) with respect to the display region 26 is also set to the left upper corner. On the other hand, with regard to the screen region 34, the origin for the coordinates (x, y) is also similarly set to an origin 38 at the left upper corner. Therefore, FIG. 4 shows a state in which a pointer 36 displayed in the screen region 34 has been set to the origin 38.

In the scrolling process of the invention, when the pointer 36 on the screen region 34 is moved, the display region 26 on the whole image region 24 is moved in accordance with the movement amount of the pointer 36. By extracting and displaying the image in the display region 26, the scroll display is executed. That is, when the scrolling operation is performed, the screen region 34 is apparently regarded as a whole image region 24. In a state in which the screen region 34 is regarded as a whole image region 24, the coordinates position of the pointer 36 is set to a start point, the coordinates of the start point are converted into the coordinates in the whole image region 24. The start point is set to the origin and the image in the display region 26 is extracted from the whole image region 24 and displayed on the display unit 16.

Therefore, in order to perform the scroll display, it is necessary to convert the coordinates position of the pointer 36 in the xy coordinates system of the screen region 34 into the coordinates position of the whole image region 24 of the XY coordinates system. To convert the coordinates (x, y) of the pointer in the screen region 34 into the coordinates (X, Y) of the whole image region 24, it is necessary to obtain a conversion magnification of the whole image region 24 for the screen region 34. The conversion magnification must be obtained with respect to each of the lateral and vertical directions. Since the size in the x direction of the screen region 34 is equal to B1 and the size in the X direction of the whole image region 24 is equal to A1 as shown in the diagram, when a conversion magnification in the lateral direction assumes K1, $$K1=A1/B1 \qquad (1)$$

On the other hand, since the size in the y direction of the screen region 34 is equal to B2 and the size in the Y direction of the whole image region 24 is equal to A2, a coordinates conversion magnification K2 in the vertical direction is $$K2=A2/B2 \qquad (2)$$

Figure 3:
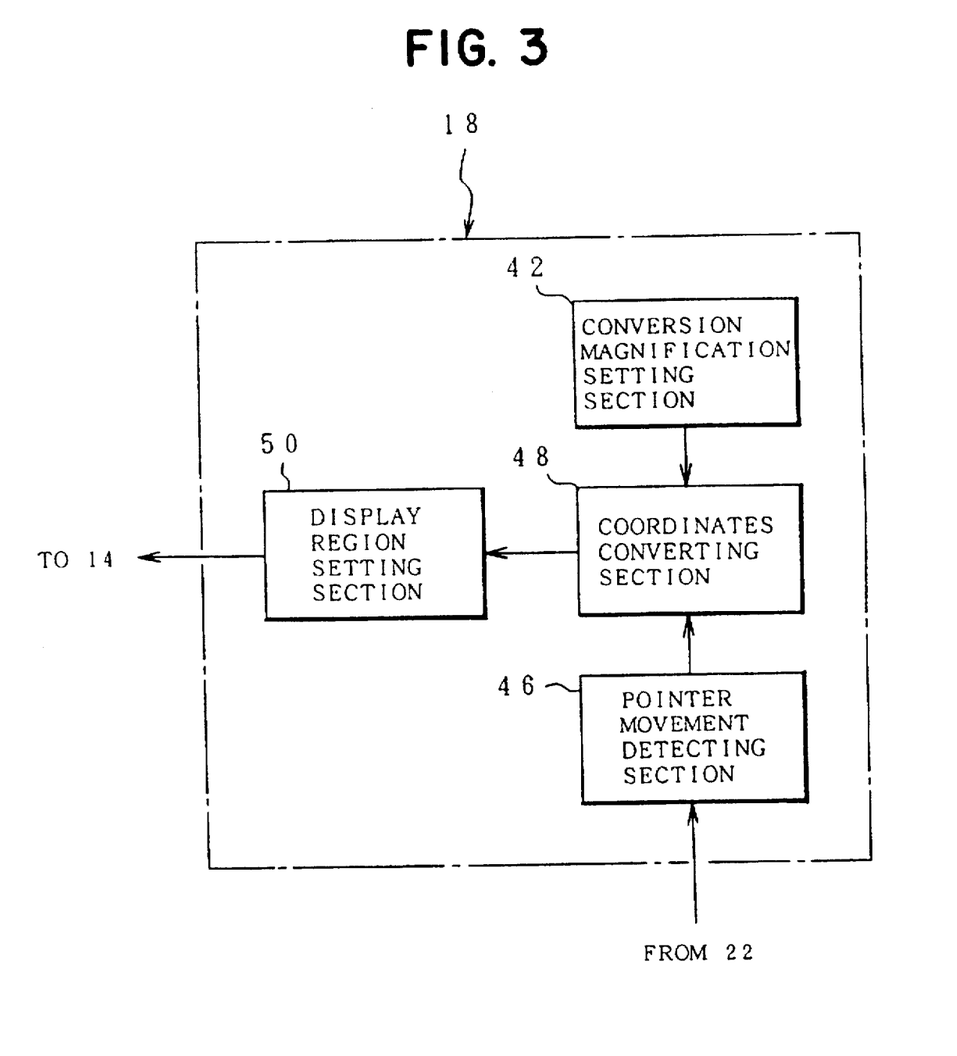
FIG. 3 is a functional block diagram of a scroll processing section in FIG. 2.

The conversion magnifications in the lateral and vertical directions by the above equations (1) and (2) are set by the conversion magnification setting section 42 shown in FIG. 3. When the coordinates conversion magnifications K1 and K2 for the whole image region 24 are obtained from the screen region 34, by multiplying the corresponding conversion magnifications K1 and K2 to the coordinates values (x, y) of the pointer 36 in the screen region 34, they can be converted into the coordinates values (X, Y) in the whole image region 24. That is, it is sufficient to execute the coordinates conversion according to the following equations.

$$X=K1 \cdot x$$

$$Y=K2 \cdot y \qquad (3)$$

The coordinates conversion according to the above equations (3) is executed by the coordinates conversing section 48. The coordinates (x, y) of the pointer 36 in the screen region 34 for the coordinates converting section 48 are obtained from the detection result of the movement amount due to the movement of the pointer device 20 in this instance by the pointer movement detecting section 46 and are supplied. When the corresponding coordinates values (X, Y) of the pointer 36 in the whole image region 24 are obtained by the above coordinates conversion, the coordinates values (X, Y) are set to the relative origin 32 of the display region 26. A region in which the size in the X direction is equal to B1 and the size in the Y direction is equal to B2 is set as a display region 26. The display region 26 is set by the display region setting section 50 in FIG. 3. After the display region 26 in the whole image region 24 was set, the whole image included in the display region 26 is read out and is sent to the display control section 14 in FIG. 2. The whole image is written into an internal frame memory and is displayed to the display unit 16 after that.

Figure 5A:
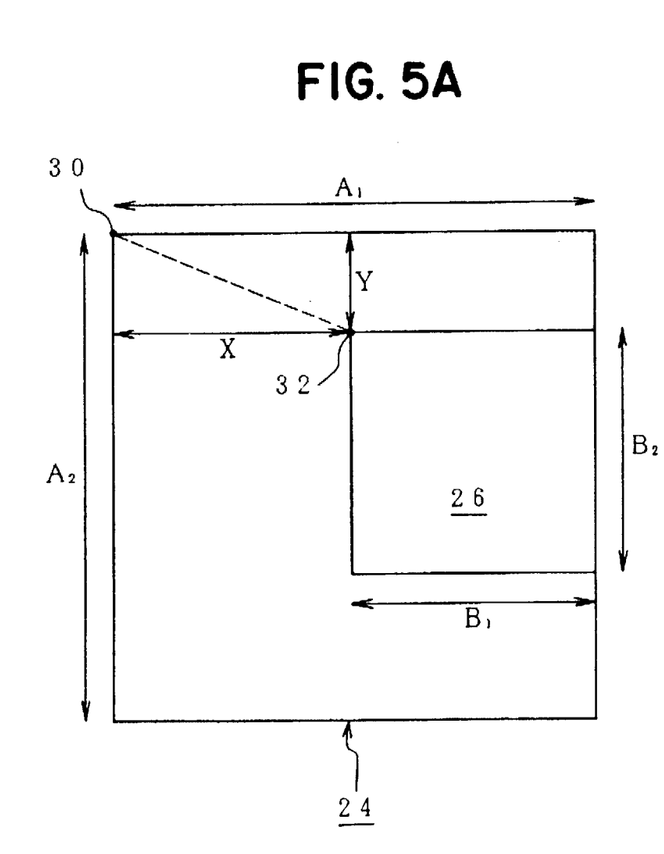
FIG. 5 is an explanatory diagram of a scrolling process in case of moving a pointer for FIG. 4.
Figure 5B:
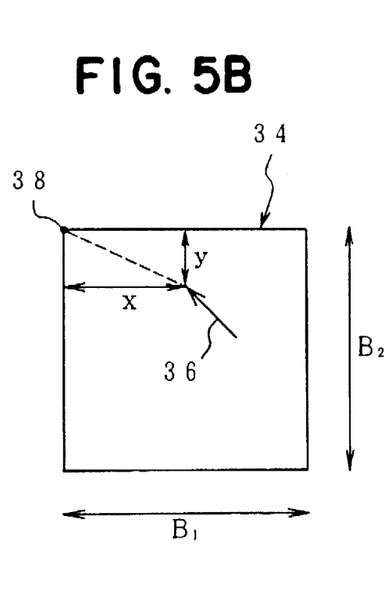

FIG. 5 shows a state in which the pointer 36 was moved on the screen region 34 by a predetermined amount while setting the state of FIG. 4 into the initial state. In the screen region 34, the pointer 36 locating at the origin 38 in FIG. 4 is moved and is located at the coordinates (x, y). The coordinates (x, y) of the pointer in the screen region 34 after it was moved are detected by the pointer movement detecting section 46. The pointer movement detecting section 46 stores coordinates $(x_i, y_i)$ of the pointer 36 at the present time point. When the pointer device 20 is operated in this state, movement amounts ($\Delta x$, $\Delta y$) in association with the operation are obtained. Therefore, coordinates $(x_{i+1}, y_{i+1})$ after the movement are obtained as follows.

$$X_{i+1}=x_i+\Delta x$$

$$y_{i+1}=y_i+\Delta y \qquad (4)$$

When the coordinates of the pointer 36 before movement are equal to those of the origin 38 as shown in FIG. 5, since $x_i$ and $y_i$ in the equation (4) are equal to 0, the coordinates of the pointer 36 after the movement shown in the diagram are determined by only the movement amounts ($\Delta x$, $\Delta y$). The coordinates (x, y) of the pointer 36 after it was moved are converted into the coordinates (X, Y) in the whole image region 24 by the coordinates conversion by the equation (3). In case of FIGS. 4 and 5, the sizes in the vertical and lateral directions of the whole image region 24 are twice as large as those of the screen region 34, so that the conversion magnification K1=K2=2. Therefore, the movement amount of the pointer 36 in the screen region 34 is twice as large as that in the whole image region 24. The display region 26 in which the coordinates (X, Y) are set to the relative origin 32 is extracted from the whole image region 24 and is displayed in the screen region 34. In the actual scrolling operation, the processing operation by a predetermined sampling period is executed for the movement of the pointer 36 by the pointer device 20. Therefore, the operations such that while the display region 26 is moving in the whole image region 24 due to the movement of the pointer 36, the image at each moving position is extracted and displayed in the screen region 34 are repeated, so that the scrolling display is performed.

Referring again to FIG. 4, a region 40 of the screen region 34 indicates an operating region of the pointer 36 which is necessary to scroll display all of the regions of the whole image region 24. That is, by moving the pointer 36 in the region 40 in the screen region 34, the scroll display which covers the whole area of the whole image region 24 can be executed. The pointer 36 can be also obviously moved over the region 40. In this case, the scroll display including a blank region exceeding the whole image region 24 is executed.

Figure 6:
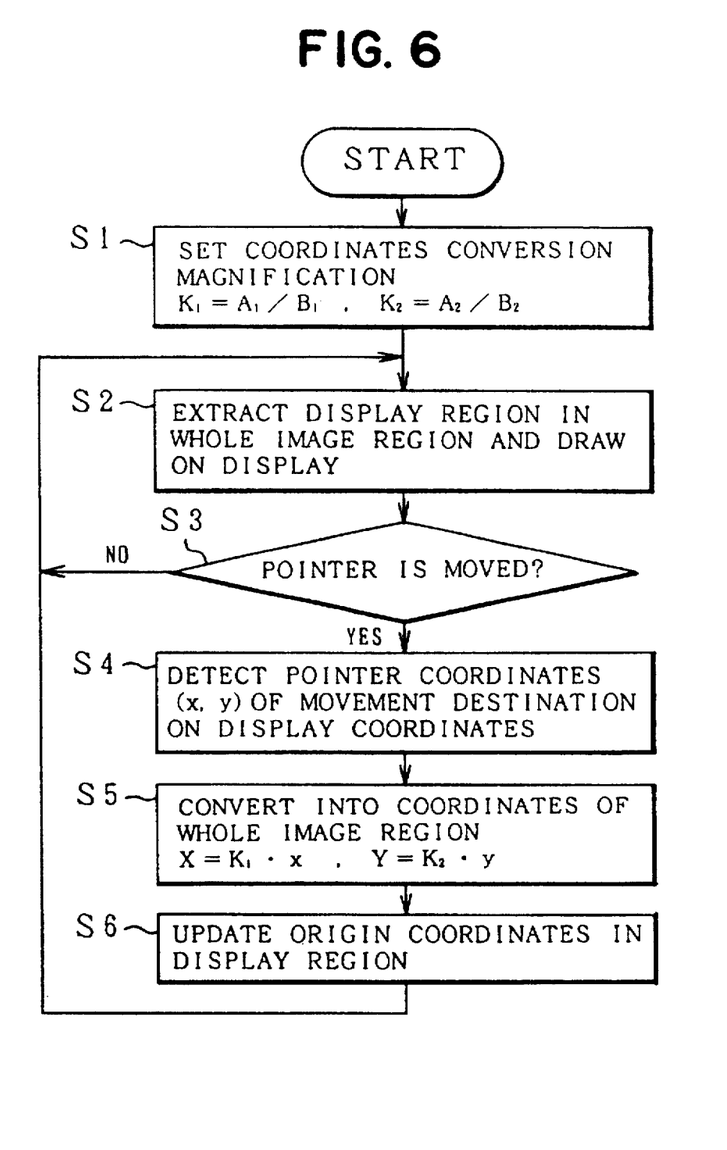
FIG. 6 is a flowchart for the scrolling process according to FIG. 3.

A flowchart of FIG. 6 shows processing operations of the scroll display in the invention. First, at the time of activation due to the turn-on of a power source of the apparatus, the coordinates conversion magnifications in the lateral and vertical directions which are used in the coordinates conversion between the screen region 34 shown in FIG. 4 and the whole image region 24 are set to K1 and K2, respectively, in step S1. In step S2, the image of the display region 26 set at present in the whole image region 24 is extracted and displayed on the display. In step S3, the movement of the pointer due to the operation of the pointer device 20 is checked. When the movement of the pointer is detected, step S4 follows. In step S4, the coordinates (x, y) of the pointer on the movement destination side on the screen region 34 are detected. In step S5, the coordinates conversion magnifications K1 and K2 are used and the pointer coordinates are converted into the coordinates (X, Y) in the whole image region 24. Subsequently, in step S6, the relative origin 32 in the display region 26 is set into the coordinates values (X, Y) obtained by the coordinates conversion, thereby updating the display region 26. After completion of the updating of the display region 26, the processing routine is again returned to step S2. The image in the display region 26 which was set is extracted from the whole image region 24 and displayed in the display.

In the scrolling process in FIG. 6, in order to distinguish the command inputting operation on the window using the pointer device 20 and the scrolling operation, for example, at the time of the command input, the operation button 20-1 is clicked by the mouse, thereby inputting a command. When the user wants to perform the scroll display in this state, for example, by depressing the operation button 20-2 for resetting, the scroll mode is set. The scroll display is executed due to the movement of the pointer 36 by the pointer device 20. When the user wants to switch from the scroll display to the original command input mode, it is sufficient to again depress the operation button 20-1 of the pointer device 20. In the discrimination between the command input mode using the pointer device 20 and the scroll display mode, it is desirable to perform the mode display to a proper position in the screen region 34, thereby enabling the operator to easily discriminate each mode.

Figure 7:
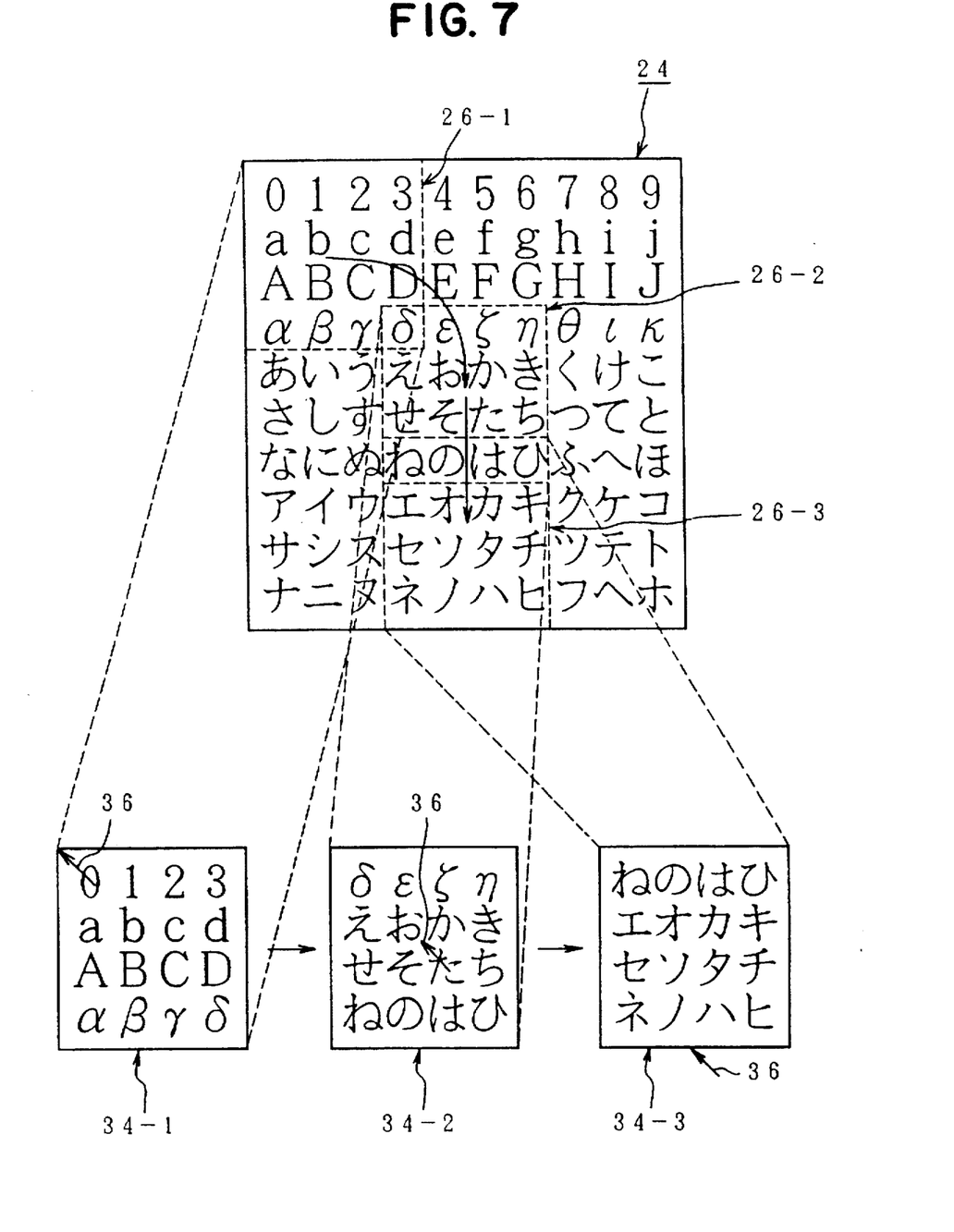
FIG. 7 is an explanatory diagram of the whole image region, display region, and screen region in the specific scrolling process according to the invention.

FIG. 7 shows a specific example of the scrolling process of the invention. For example, Arabic numerals, alphabets, Greek letters, hiragana (cursive kana characters), and katakana (square form of kana) have been stored in the whole image region 24. First, as shown in a screen region 34-1, the pointer 36 is set to the origin at the left upper corner. In this case, a display region 26-1 is set to the left upper corner of the whole image region 24. The image included in the display region 26-1 is extracted and displayed in the screen region 34-1. It is now assumed that the pointer 36 was moved to the position shown in a screen region 34-2. In association with the movement of the pointer 36, in the whole image region 24, the display region is shifted from the display region 26-1 to a display region 26-2 and the image extracted from the display region 26-2 is displayed in the screen region 34-2. Further, in the case where the pointer 36 was moved to the position shown in a screen region 34-3, in the whole image region 24, the display region is shifted from the display region 26-2 to a display region 26-3. The image in the display region 26-3 is extracted and displayed.

Another embodiment of the invention will now be described. In the foregoing embodiment, the scroll display in which the display region is moved in both of the vertical and lateral directions in association with the movement of the pointer has been described as an example. However, when the whole image region 24 is small, it is sufficient to perform the scroll display in either one of the vertical or lateral direction.

Figure 8A:
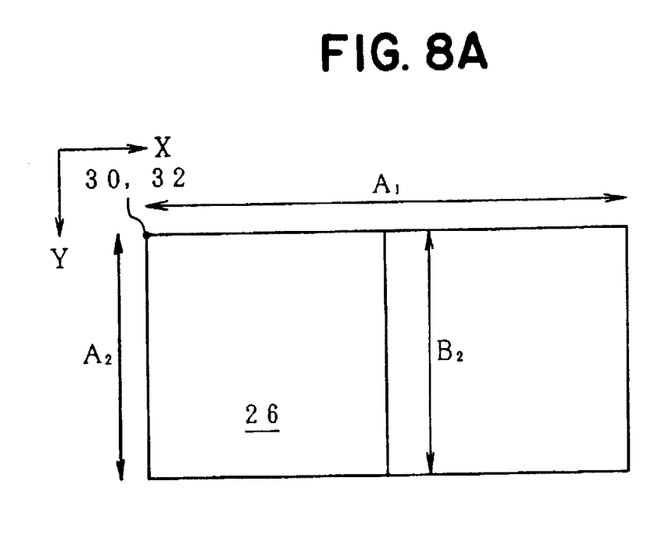
FIG. 8 is an explanatory diagram of another embodiment in case of scrolling only in the lateral direction.
Figure 8B:
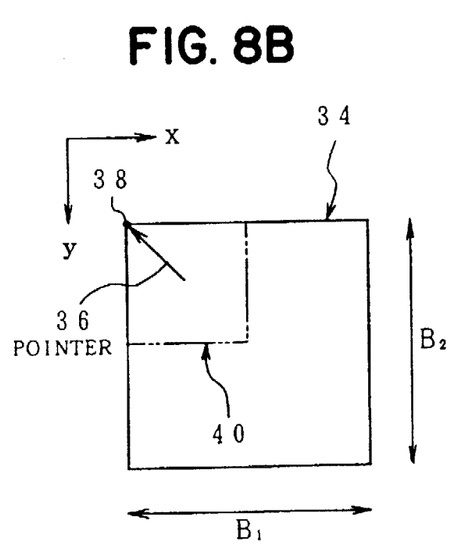

FIG. 8 shows the case where sizes A2 and B2 in the vertical direction of the whole image region 24 and screen region 34 are equal and the size A1 in the lateral direction is large. In this case, only the coordinates conversion magnification K1=A1/A2 in the lateral direction is obtained. The coordinates conversion magnification K2 in the vertical direction is fixedly set to K2=0. The scrolling process shown in the flowchart of FIG. 6 is executed. In case of fixing the conversion magnification K2 in the vertical direction to K2=0, only the coordinates conversion of only the coordinate value in the lateral direction is executed for the movement of the pointer 36. The display region 26 is slid in only the lateral direction in the whole image region 24 in association with the movement of the pointer 36, thereby performing the scroll display.

Figure 9A:
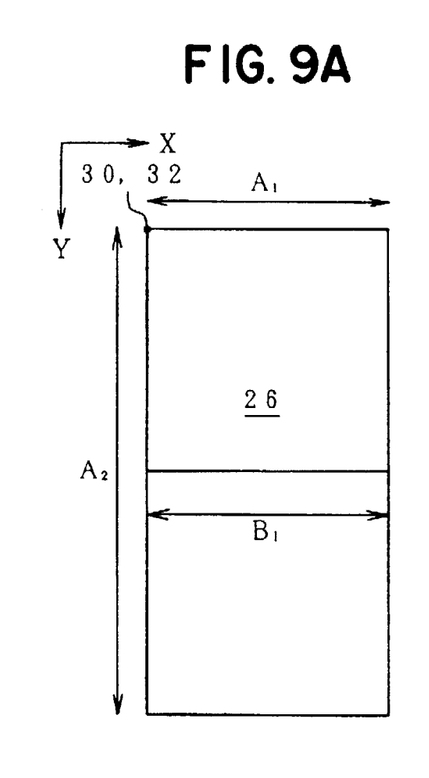
FIG. 9 is an explanatory diagram of another embodiment in case of scrolling only in the vertical direction.
Figure 9B:
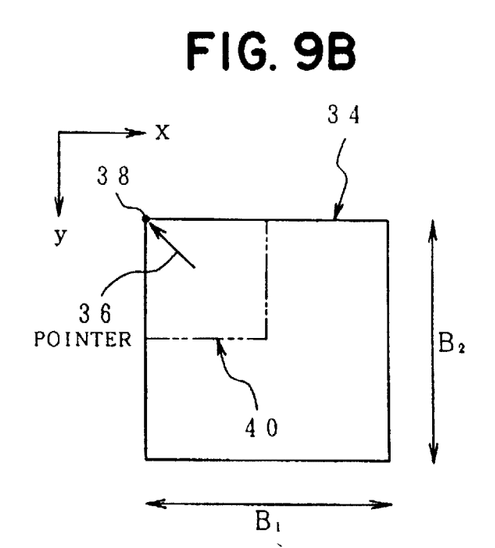

FIG. 9 shows the case where the sizes A1 and B1 in the lateral direction of the whole image region 24 and the screen region 34 are equal and the size A2 in the vertical direction is larger than B2. In this case, the coordinates conversion magnification K1 in the lateral direction is fixed to K1=0. The scrolling process in the flowchart of FIG. 6 is executed by using only the coordinates conversion magnification K2=A2/B2 in the vertical direction. In case of fixing the conversion magnification K in the lateral direction to K=0, the coordinates conversion is executed to only the coordinate value in the vertical direction for the movement of the pointer 36 in the screen region 34. In association with the movement of the pointer 36, the display region 26 is moved in only the vertical direction in the whole image region 24, thereby performing the scroll display.

According to the invention as mentioned above, by merely operating the pointer on the display screen, the scroll display can be easily executed and the movement amount of the pointer 36 is small. Therefore, the operation is simple and a burden on the user is remarkably reduced.

In FIG. 8, the coordinates conversion magnification K2 in the vertical direction can be also set to K2=1. In this case,
the scroll display including the position exceeding the whole image region 24 is executed. Similarly, with respect to FIG. 9, the coordinates conversion magnification K1 in the lateral direction is set to K1=1 and the scroll display having a blank region exceeding the whole image region 24 can be also performed. The scrolling process in the invention can be constructed by hardware or can be also realized by software. Further, the invention is not limited by the numerical values shown in the above embodiments.

What is claimed is:

1. An apparatus scroll displaying an image on a screen during a scrolling operation, said apparatus comprising:

a memory section storing whole image information;

a display displaying a partial image extracted from said whole image information of said memory section, said display comprising a display screen;

a first region setting section setting a whole image region having first display coordinates (X, Y) for said whole image information in said memory section said whole image region moving as the coordinates (X, Y) are moved;

a second region setting section setting a screen region having second display coordinates (x, y) for the display screen of said display;

a conversion magnification setting section setting coordinates conversion magnifications (K1, K2) for converting the second display coordinates (x, y) in said screen region into the first coordinates (X, Y) in said whole image region;

a pointer operating section moving a pointer on the display screen of said display during the scrolling operation;

a pointer movement detecting section detecting coordinates values (x, y) of said second display coordinates of a present pointer position during the movement on the screen by said pointer operating section;

a coordinates converting section coupled to the conversion magnification setting section and to the pointer operating section and converting the pointer coordinates values (x, y) after completion of movement detected by said pointer movement detecting section into coordinates values (X, Y) of the first display coordinates of the whole image region by using said coordinates conversion magnifications (K1, K2) causing the coordinates (X, Y) of said whole image region to move as the coordinates (x, y) of the pointer move;

a third region setting section coupled to the coordinates converting section and setting a display region corresponding to said screen region into said whole image region by using the conversion coordinates values (X, Y) obtained by said coordinates converting section as a start point; and a display control section coupled to the display and to the second region setting section and controlling the scrolling operation by extracting the image of said display region set by said third region setting section from said whole image region and for allowing the image to be scroll displayed by said display.

2. An apparatus according to claim 1, wherein if a width in the X-axis direction of said whole image region is set to (A1), a width in the Y-axis direction is set to (A2), a width in the X-axis direction of said screen region is set to (B1), and a width in the Y-axis direction is set to (B2), said conversion magnification setting section sets said conversion magnifications (K1, K2) by calculating based on the following equations:

$$K1 = A1/B1$$

$$K2 = A2/B2.$$

3. An apparatus according to claim 1, wherein if the coordinates values on the pointer movement destination side on the screen region by the scrolling operation are set to (x, y), said coordinates converting section converts coordinates values (x, y) into the coordinates values (X, Y) of said whole image region by the following equations:

$$X = K1 \cdot x$$

$$Y = K2 \cdot y.$$

4. An apparatus according to claim 1, wherein said display region setting section sets the conversion coordinates values (X, Y) obtained by said coordinates converting section into relative origin coordinates values of said display region which is extracted from said whole image region.

5. An apparatus according to claim 1, wherein said conversion magnification setting section fixes the conversion magnification (K1) into 0 and executes the scrolling operation of the screen in only a vertical direction.

6. An apparatus according to claim 1, wherein said conversion magnification setting section fixes the conversion magnification (K2) into 0 and executes the scrolling operation of the screen in only a lateral direction.

7. An apparatus according to claim 1, wherein said screen region is a window region on the display screen.

8. A method of scroll displaying an image on a screen during a scrolling operation, said method comprising:

a first region setting step of setting a whole image region having first display coordinates (X, Y) for whole image information stored in a memory section said whole image region moving as the coordinates (X, Y) are moved;

a second region setting step of setting a screen region having second display coordinates (x, y) for a display screen of a display;

a conversion magnification setting step of setting coordinates conversion magnifications (K1, K2) for converting the second display coordinates (x, y) of said screen region into the first display coordinates (X, Y) of the whole image region;

a pointer operating step of moving a pointer on the screen of said display at the time of a scrolling operation;

a pointer movement detecting step of detecting the coordinates values (x, y) of said second display coordinates of a present pointer the movement of the pointer on the screen by said pointer operating step;

a coordinates converting step of converting the pointer coordinates values (x, y) after the movement detected by said pointer movement detecting step into the coordinates values (X, Y) of the whole image region by using said coordinates conversion magnifications (K1, K2) causing the coordinates (X, Y) of said whole image region to move as the coordinates (x, y) of the pointer move;

a third region setting step of setting a display region corresponding to the screen region into said whole image region while using the conversion coordinates values (X, Y) derived in said coordinates converting step as a start point; and a display step of controlling the scrolling operation by extracting the image in the display region set by said third region setting step from the whole image region and allowing the extracted image to be scroll displayed by said display.

9. A method according to claim 8, wherein if a width in the X-axis direction of the whole image region is set to (A1), a width in the Y-axis direction is set to (A2), a width in the X-axis direction of the screen region is set to (B1) and a width in the Y-axis direction is set to (B2), in said conversion magnification setting step, the conversion magnifications (K1, K2) are calculated and set by the following equations:

$$K1 = A1/B1$$

$$K2 = A2/B2.$$

10. A method according to claim 8, wherein when the coordinates values on the pointer movement destination side in the screen region by the scrolling operation are set to (x, y), in said coordinates converting step, coordinates values (x, y) are converted into the coordinates values (X, Y) of the whole image region by the following equations:

$$X = K1 \cdot x$$

$$Y = K2 \cdot y.$$

11. A method according to claim 8, wherein in said third region setting step, the conversion coordinates values (X, Y) obtained in said coordinates converting step are set to relative origin coordinates values of the display region to extract the image from the whole region.

12. A method according to claim 8, wherein in said conversion magnification setting step, said conversion magnification (K1) is fixed to 0, thereby performing the screen scroll in only the vertical direction.

13. A method according to claim 8, wherein in said conversion magnification setting step, said conversion magnification (K2) is fixed to 0, thereby executing the screen scroll in only the lateral direction.

14. A method according to claim 8, wherein said screen region is a window region on the display screen.

15. A display system, comprising:

a memory storing an image and having a display region projected onto the image, the display region including contents of the image within the display region, and the display region having memory coordinates in the image and the display region moving as the coordinates are changed;

a monitor display having a screen region displaying the contents of the display region and having a pointer with a pointer position in the screen region corresponding to the memory coordinates of the display region in the image; and a computer coupled to said memory and said monitor display and controlling the memory coordinates responsive to movement of the pointer position causing the memory coordinates to move as the pointer moves in the screen region.

* * * * *